(12) United States Patent
Wang

(10) Patent No.: US 12,269,554 B2
(45) Date of Patent: Apr. 8, 2025

(54) INTELLIGENT FOLLOW-UP ILLUMINATION DEVICE INCLUDING SUPPORT COMPONENT

(71) Applicant: Cheng Wang, Taipei (TW)

(72) Inventor: Cheng Wang, Taipei (TW)

(*) Notice: Subject to any disclaimer, the term of this patent is extended or adjusted under 35 U.S.C. 154(b) by 0 days.

(21) Appl. No.: 18/432,271

(22) Filed: Feb. 5, 2024

(65) Prior Publication Data
US 2024/0263772 A1 Aug. 8, 2024

(30) Foreign Application Priority Data
Feb. 6, 2023 (TW) .................. 112104030

(51) Int. Cl.
| | |
|---|---|
| *B62J 6/023* | (2020.01) |
| *B60Q 1/04* | (2006.01) |
| *B60Q 1/08* | (2006.01) |
| *B62J 6/01* | (2020.01) |
| *B62J 6/026* | (2020.01) |

(Continued)

(52) U.S. Cl.
CPC ............ *B62J 6/023* (2020.02); *B60Q 1/0483* (2013.01); *B60Q 1/085* (2013.01); *F21V 21/30* (2013.01); *F21V 23/0492* (2013.01); *B60Q 2300/136* (2013.01); *B62J 6/01* (2020.02); *B62J 6/026* (2020.02)

(58) Field of Classification Search
CPC ........ B60J 1/023; B60Q 1/0483; B60Q 1/085; B60Q 2300/136
See application file for complete search history.

(56) References Cited

U.S. PATENT DOCUMENTS

| | | | | |
|---|---|---|---|---|
| 5,426,571 A | * | 6/1995 | Jones ..................... | B60Q 1/115 362/466 |
| 8,147,106 B2 | * | 4/2012 | Eto ........................ | B60Q 1/076 362/523 |
| 11,150,335 B2 | * | 10/2021 | Pfau ........................ | G01S 13/04 |

(Continued)

FOREIGN PATENT DOCUMENTS

| | | |
|---|---|---|
| CN | 101970262 A | 2/2011 |
| EP | 2252480 B1 | 8/2013 |

(Continued)

*Primary Examiner* — Keith G. Delahoussaye
(74) *Attorney, Agent, or Firm* — Li & Cai Intellectual Property (USA) Office

(57) ABSTRACT

An intelligent follow-up illumination device includes a support component, a rotating component, a driving component, a light source component, a projection component, a control component, and a casing. The support component is adapted to be installed on a vehicle in a fixed state. The rotating component is disposed to rotate relative to the support component. The driving component is disposed between the support component and the rotating component to drive the rotating component to perform a rotation operation around a rotation axis. The light source component is disposed inside the rotating component to emit illumination light. The projection component is retained on the rotating component to project the illumination light outwardly, so as to form a light distribution pattern. The control component is connected to the rotating component and adapted to send a control command to the driving component. The casing is disposed to enclose the control component.

26 Claims, 13 Drawing Sheets

(51) Int. Cl.
*F21V 21/30* (2006.01)
*F21V 23/04* (2006.01)

(56) References Cited

U.S. PATENT DOCUMENTS

| | | |
|---|---|---|
| 2013/0258689 A1 | 10/2013 | Takahira et al. |
| 2017/0028903 A1 | 2/2017 | Mochizuki et al. |
| 2022/0314867 A1 | 10/2022 | Zhu et al. |

FOREIGN PATENT DOCUMENTS

| | | |
|---|---|---|
| TW | M547512 U | 8/2017 |
| TW | 202237445 A | 10/2022 |

\* cited by examiner

INTELLIGENT FOLLOW-UP ILLUMINATION DEVICE INCLUDING SUPPORT COMPONENT

CROSS-REFERENCE TO RELATED PATENT APPLICATION

This application claims the benefit of priority to Taiwan patent application Ser. No. 11/210,4030, filed on Feb. 6, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an illumination device, and more particularly to an intelligent follow-up illumination device.

BACKGROUND OF THE DISCLOSURE

A headlight (a.k.a. a headlamp) is referred to by some as the "eyes" of a vehicle, such as a motorcycle or a car, and is very important for traffic safety. In the early days, an illumination pattern provided by each of low and high beams in the headlight has a fixed orientation and cannot be adjusted to adapt to a tilt angle of a vehicle body. This may cause many inadequacies in actual use of the headlight. For example, when the vehicle is traveling on a curved road, the illumination pattern produced by the vehicle may be tilted towards the right or left. As a result, a dark region may be present in front of the moving vehicle, so that the driver is unable to clearly see road conditions at an inner side of the curved road, which may cause a traffic accident to occur.

With the continuous advancement of lighting technology for vehicles, more and more headlights with an adjustable lighting pattern are appearing on the market. Such headlights can adjust characteristics of the illumination pattern according to a tilt angle of a vehicle body, such as an illumination range and an illumination distance, so that the driver can be provided with the best possible vision to ensure driving safety. Among them, one type of headlight uses a plurality of fill lights to provide auxiliary lighting when turning corners. However, due to the arrangement of the fill lights, a volume of the headlight is difficult to be reduced.

SUMMARY OF THE DISCLOSURE

In response to the above-referenced technical inadequacies, the present disclosure provides an intelligent follow-up illumination device.

In order to solve the above-mentioned problems, one of the technical aspects adopted by the present disclosure is to provide an intelligent follow-up illumination device, which includes a support component, a rotating component, a driving component, a light source component, a projection component, a control component, and a casing. The support component is adapted to be installed on a vehicle in a fixed state. The rotating component is disposed to rotate relative to the support component. The driving component is disposed between the support component and the rotating component to drive the rotating component to perform a rotation operation around a rotation axis according to a control command. The light source component is disposed inside the rotating component to emit illumination light. The projection component is retained on the rotating component to project the illumination light outwardly, so as to form a light distribution pattern. The control component is connected to the rotating component and adapted to send the control command to the driving component. The casing is disposed to enclose the control component. Furthermore, the rotating component includes a housing portion, a base portion disposed inside the housing portion, and a shaft portion extending from the base portion. The housing portion defines an accommodation space for accommodating the support component, the driving component, and the light source component. The projection component is fixed by the housing portion and the light source component is disposed on the base portion, such that a light transmission path from the light source component passes through the projection component. The shaft portion defines the rotation axis and is connected integrally (i.e., as a whole) with the control component. In addition, the support component includes an abutting portion and an assembly slot passing through the abutting portion. The abutting portion is disposed to retain the driving component in the accommodation space of the housing portion, and the assembly slot is pivotably coupled to the shaft portion.

In one of the possible or preferred embodiments, the control component includes a motion sensor that is adapted for acquiring motion state information of the rotating component. The control component is configured to send the control command to the driving component according to the motion state information.

In one of the possible or preferred embodiments, the base portion is disposed to divide the accommodation space of the housing portion into a first accommodation space and a second accommodation space, the first accommodation space is located at one side of the base portion and the second accommodation space is located at another opposite side of the base portion, and the shaft portion extends out of the second accommodation space from the base portion. The abutting portion of the support component and the driving component are located in the second accommodation space and between the housing portion and the shaft portion of the rotating component, and the light source component is located in the first accommodation space.

In one of the possible or preferred embodiments, the driving component is disposed between the abutting portion of the support component and the housing portion of the rotating component.

In one of the possible or preferred embodiments, the driving component includes an electromagnetic component and a magnetic member. The electromagnetic component is fixedly connected to the housing portion of the rotating component, and the magnetic member is fixedly connected to the abutting portion of the support component.

In one of the possible or preferred embodiments, the electromagnetic component includes a core and a plurality of coil windings. The core has a ring portion and a plurality of leg portions. The ring portion is fixedly connected to the housing portion of the rotating component. The leg portions extend from an inner periphery of the ring portion and are spaced apart from each other and disposed opposite to the magnetic member. The coil windings are respectively wrapped around the leg portions.

In one of the possible or preferred embodiments, the intelligent follow-up illumination device includes a bearing unit disposed between the abutting portion of the support component and the shaft portion of the rotating component. Furthermore, the core, the magnetic member, and the bearing unit correspond in position to each other, and a geometric center of the ring portion of the core, the magnetic member, and the bearing unit coincide with each other on the rotation axis.

In one of the possible or preferred embodiments, the driving component is disposed between the abutting portion of the support component and the shaft portion of the rotating component.

In one of the possible or preferred embodiments, the driving component includes an electromagnetic component and a magnetic member, the electromagnetic component is fixedly connected to the shaft portion of the rotating component, and the magnetic member is fixedly connected to the abutting portion of the support component.

In one of the possible or preferred embodiments, the electromagnetic component includes a core and a plurality of coil windings. The core has a ring portion and a plurality of leg portions. The ring portion is fixedly connected to the shaft portion of the rotating component. The leg portions extend from an outer periphery of the ring portion and are spaced apart from each other and disposed opposite to the magnetic member. The coil windings are respectively wrapped around the leg portions.

In one of the possible or preferred embodiments, the intelligent follow-up illumination device includes a bearing unit disposed between the abutting portion of the support component and the housing portion of the rotating component. Furthermore, the core, the magnetic member, and the bearing unit correspond in position to each other, and a geometric center of the ring portion of the core, the magnetic member, and the bearing unit coincide with each other on the rotation axis.

In one of the possible or preferred embodiments, the control component includes a control printed circuit board (PCB), and the motion sensor is integrated on the control PCB. The rotating component includes a retaining portion for retaining the control PCB.

In one of the possible or preferred embodiments, the retaining portion includes a supporting plate and an engaging sleeve extending from the supporting plate. The supporting plate is connected integrally (i.e., as a whole) with the control PCB. The engaging sleeve is sleeved on and engaged with the shaft portion.

In one of the possible or preferred embodiments, a closed space is surroundingly defined by the casing and the supporting plate of the retaining portion, and the control PCB is located in the closed space.

In one of the possible or preferred embodiments, the base portion has a carrying surface for disposing the light source component. The base portion is disposed to divide the accommodation space of the housing portion into a first accommodation space and a second accommodation space, the first accommodation space is located at one side of the base portion, and the second accommodation space is located at another opposite side of the base portion. The shaft portion extends out of the second accommodation space from the base portion. The housing portion is provided with a first wire hole. The base portion is provided with a second wire hole and a wire groove that is recessed from the carrying surface. Furthermore, a wire passage is provided and passes through the base portion and the shaft portion along the direction of the rotation axis. The supporting plate of the retaining portion is provided with a third wire hole. The first wire hole is disposed to enable the first accommodation space to be in communication with the external environment. The wire groove, the wire passage, and the third wire hole are in fluid (spatial) communication.

In one of the possible or preferred embodiments, the first wire hole has a first sealing plug disposed therein. The second wire hole has a second sealing plug disposed therein. A first sealing gasket is disposed at a position between the housing portion and the projection component and along a peripheral edge of the projection component. A second sealing gasket is disposed at a position between the shaft portion and the engaging sleeve of the retaining portion, and surrounds the wire passage. A third sealing gasket is disposed at a position between the supporting plate of the retaining portion and an inner surface of the casing and along a peripheral edge of the supporting plate, and surrounds the closed space.

In one of the possible or preferred embodiments, the projection component has a light input surface and a light output surface opposite to the light input surface, the light source component includes a solid light source and a light guiding portion. The solid light source is configured to emit illumination light, and the light guiding portion is configured to guide the illumination light to the light input surface of the projection component.

In one of the possible or preferred embodiments, each of the light input surface and the light output surface of the projection component is a flat surface.

In one of the possible or preferred embodiments, the rotating component includes a housing portion, a base portion disposed inside the housing portion, and a shaft portion extending from the base portion. The housing portion defines an accommodation space for accommodating the support component, the driving component, and the light source component.

The housing portion has a first carrying surface, and the projection component is fixed by the housing portion. The base portion has a second carrying surface that is connected and perpendicular to the first carrying surface. The shaft portion defines the rotation axis and is connected as a whole to the control component. The light source component includes a conductive substrate and an adapter board, the conductive substrate is disposed on the first carrying surface and the solid light source is mounted on the conductive substrate, and the adapter board is disposed on the second carrying surface and configured to establish an electrical connection between the conductive substrate and the control component.

In conclusion, in the intelligent follow-up illumination device provided by the present disclosure, by virtue of the rotating component including a housing portion, a base portion disposed inside the housing portion, and a shaft portion extending from the base portion; the housing portion defining an accommodation space for accommodating the support component, the driving component, and the light source component; the projection component being fixed by the housing portion and the light source component being disposed on the base portion such that a light transmission path from the light source component passes through the projection component; the shaft portion defining the rotation axis and being connected as a whole to the control component; the support component including an abutting portion and an assembly slot passing through the abutting portion; the abutting portion being disposed to retain the driving component in the accommodation space of the housing portion; and the assembly slot being pivotably coupled to the shaft portion, the driving component can be integrated into the rotating component and enable the driving component to directly drive the rotating component without using any power transmission mechanisms such as a drive shaft and a gear set. Furthermore, in the intelligent follow-up illumination device of the present disclosure, the optical axis of the projection component is parallel to the rotation axis of the rotating component, and preferably substantially coincides with the rotation axis of the rotating component. Therefore, the control error of the rotation operation of the rotating component can be reduced, thereby increasing the accuracy in adjusting the rotational angle of the projection component.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
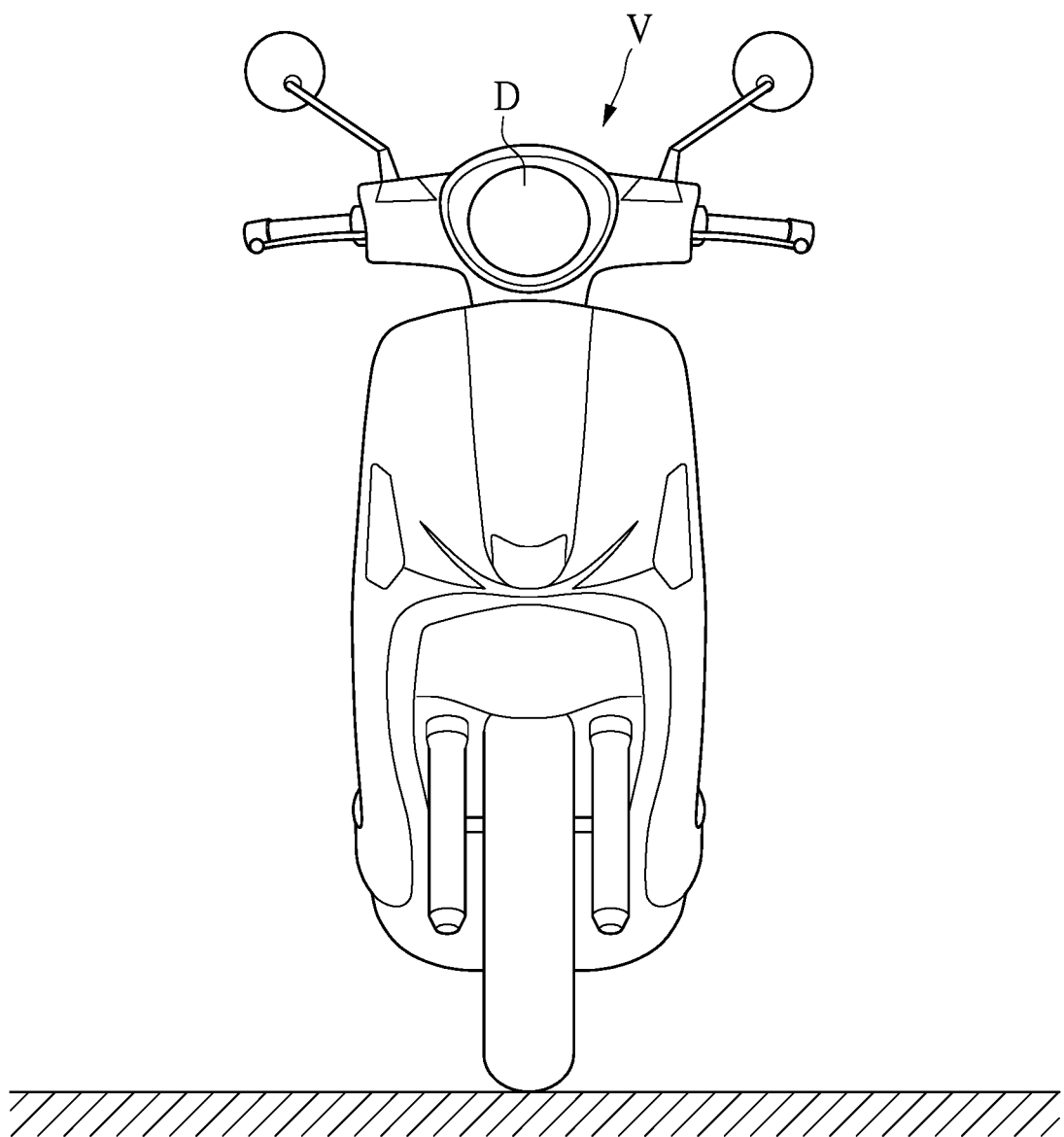
FIG. 1 is a schematic view showing an intelligent follow-up illumination device according to one embodiment of the present disclosure when used in a vehicle.
Figure 2:
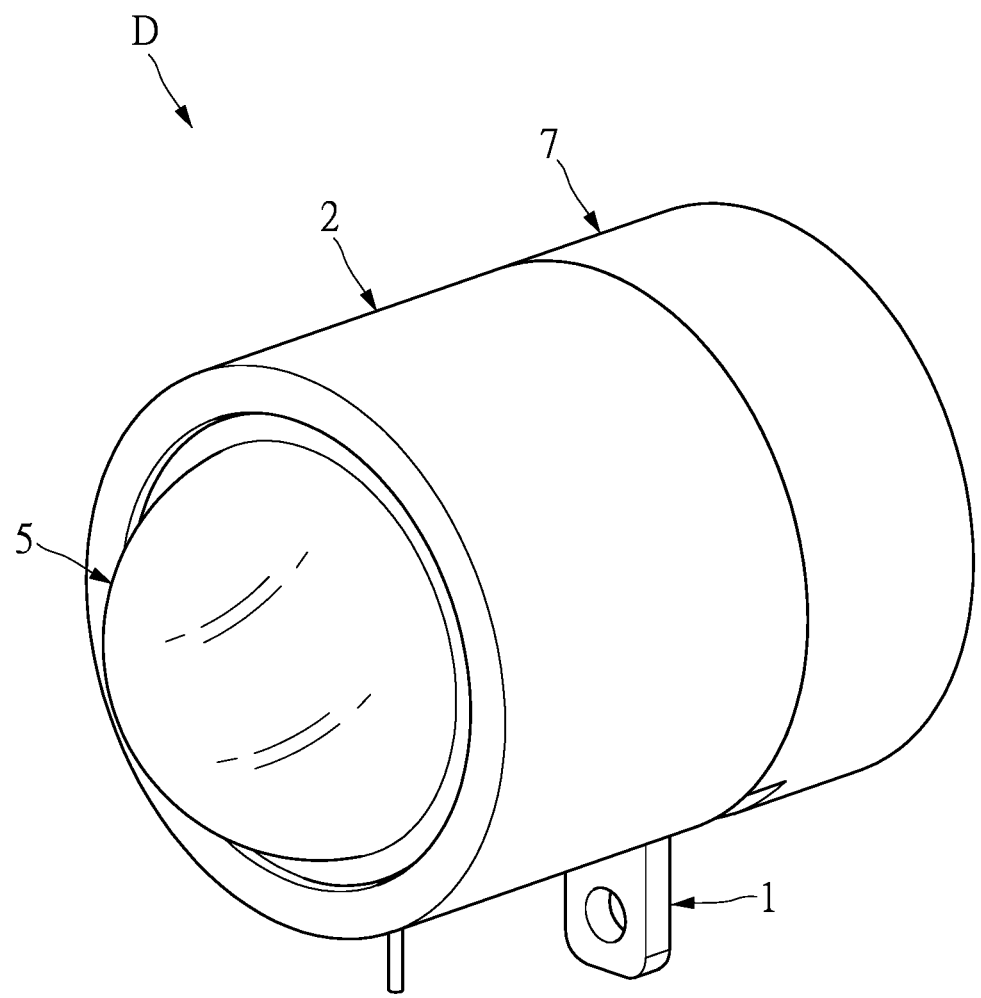
FIG. 2 is a schematic assembled view of an intelligent follow-up illumination device according to a first embodiment of the present disclosure.
Figure 3:
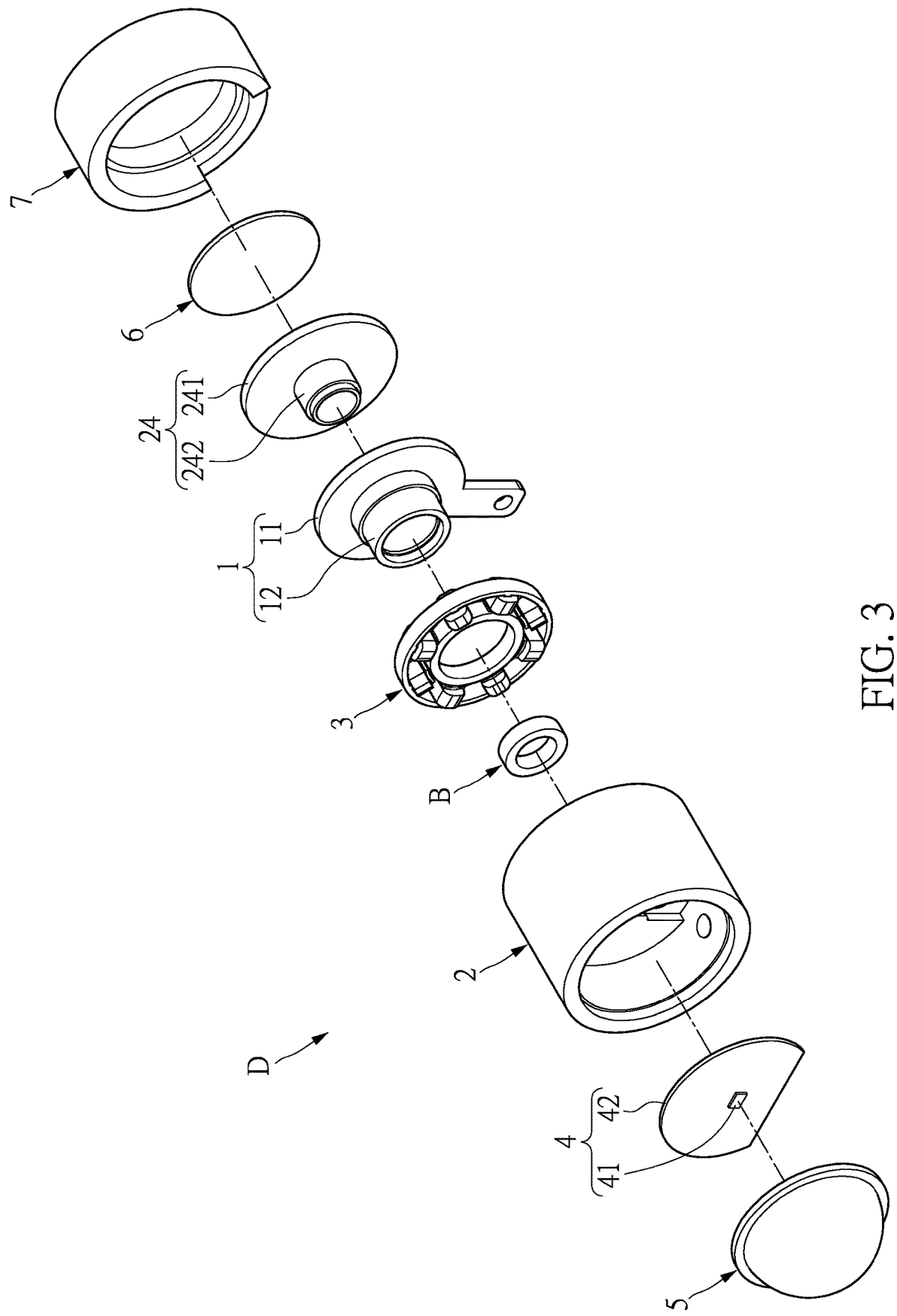
FIG. 3 is a schematic exploded view of the intelligent follow-up illumination device according to the first embodiment of the present disclosure.
Figure 4:
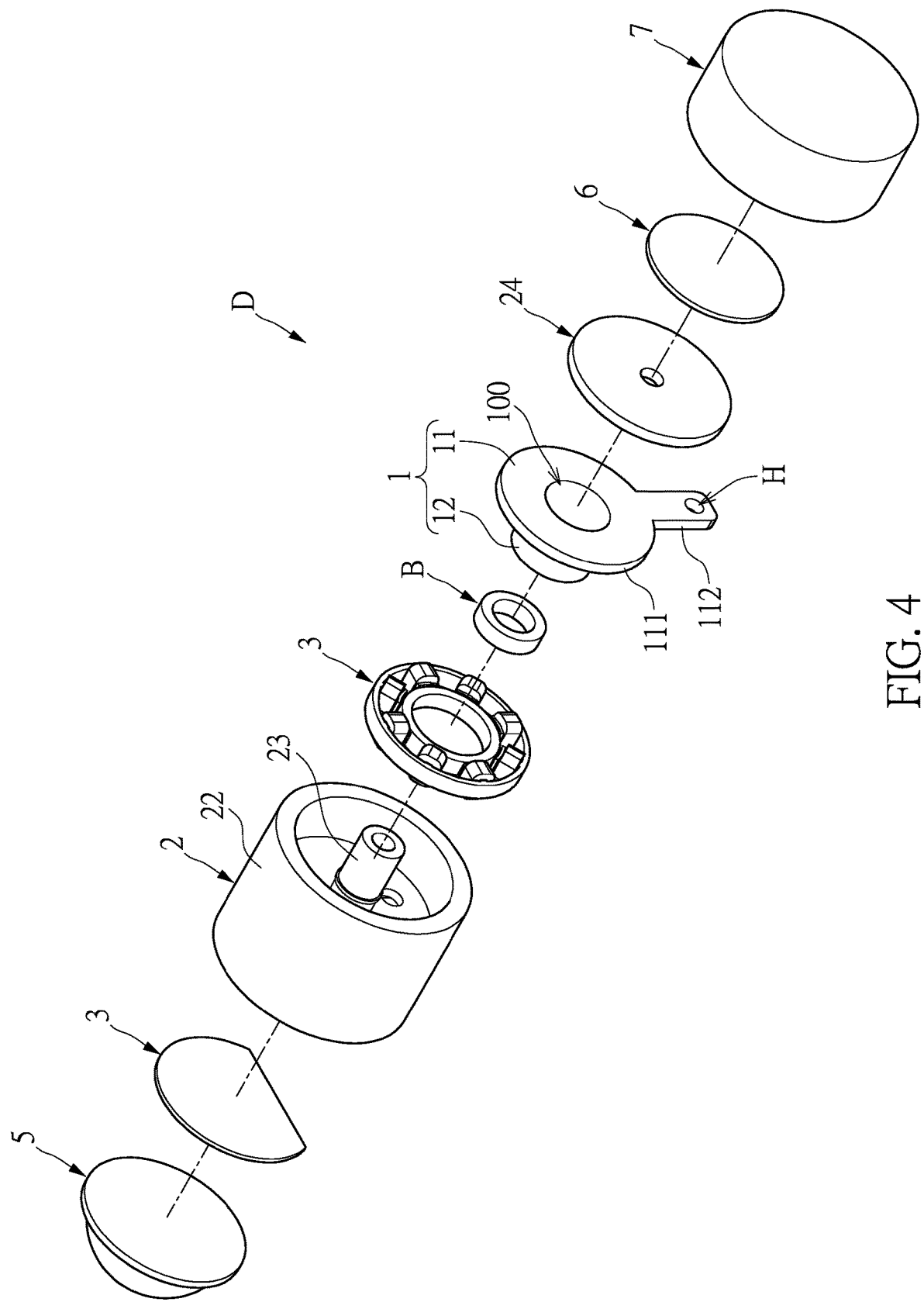
FIG. 4 is another schematic exploded view of the intelligent follow-up illumination device according to the first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Reference is made to FIG. 2 to FIG. 5, which show required components and their assembly of an intelligent follow-up illumination device D according to a first embodiment of the present disclosure. As shown in the above figures, the intelligent follow-up illumination device D can be used to provide frontal illumination for a vehicle V with two wheels (e.g., a motorcycle) and mainly includes a support component 1, a rotating component 2, a driving component 3, a light source component 4, a projection component 5, and a control component 6. The rotating component 2 and the driving component 3 are disposed on the basis of the support component 1, and the light source component 4, the projection component 5, and the control component 6 are combined with the rotating component 2 to form a single structure.

Referring to FIG. 1 and FIG. 8 to FIG. 10, in the present disclosure, the support component 1 is adapted to be installed on a vehicle V in a fixed state. The rotating component 2 is disposed to rotate relative to the support component 1. The driving component 3 is disposed between the support component 1 and the rotating component 2 to drive the rotating component 2. Furthermore, the light source component 4 is disposed inside the rotating component 2 to emit illumination light. The projection component 5 is retained on the rotating component 2 to project the illumination light outwardly, so as to form a light distribution pattern P having a horizontal cut-off line CL. The control component 6 is connected to the rotating component 2 and includes a motion sensor 63 that is adapted for acquiring motion state information of the control component 6. In addition, the control component 6 is configured to send a control command to the driving component 3 according to the motion state information acquired by the motion sensor 63. Accordingly, the driving component 3 drives the rotating component 2 to perform a rotation operation around a rotation axis A1, and the light source component 4, the projection component 5, and the control component 6 are configured to rotate together with the rotating component 2. Therefore, the intelligent follow-up illumination device D of the present disclosure can provide follow-up illumination of the low beam without the use of a magnetic encoder disposed therein, thus reducing manufacturing costs.

Figure 8:
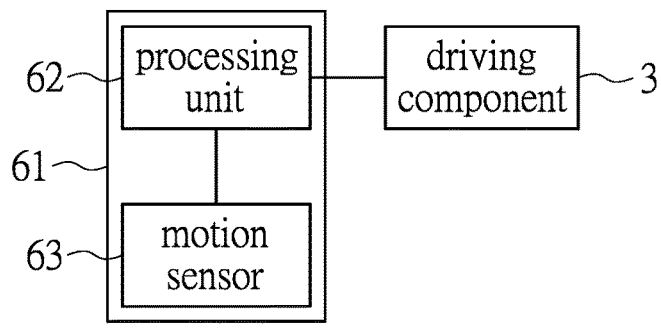
FIG. 8 is a functional block diagram showing a configuration for realizing a follow-up illumination function of the intelligent follow-up illumination device according to one embodiment of the present disclosure.
Figure 9:
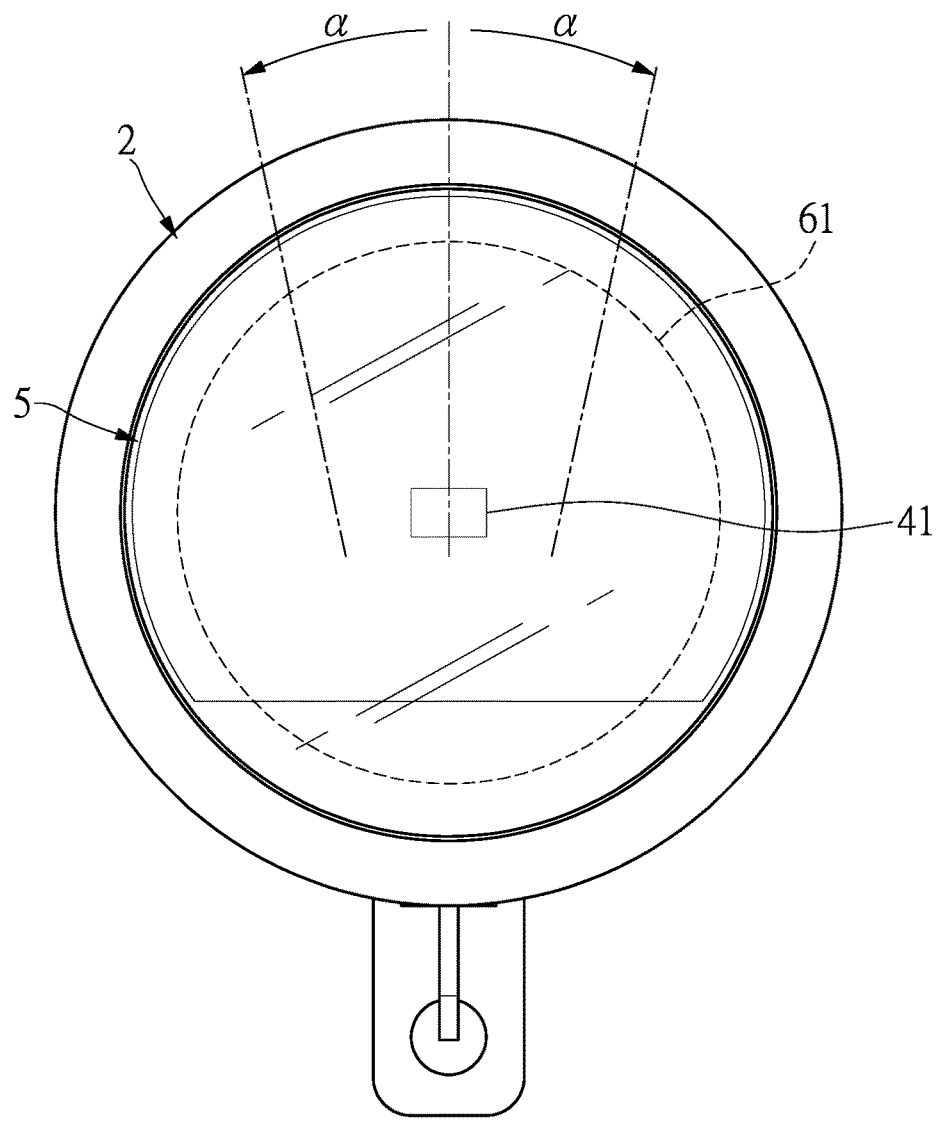
FIG. 9 is a schematic view showing a rotation of the intelligent follow-up illumination device according to one embodiment of the present disclosure.
Figure 10:
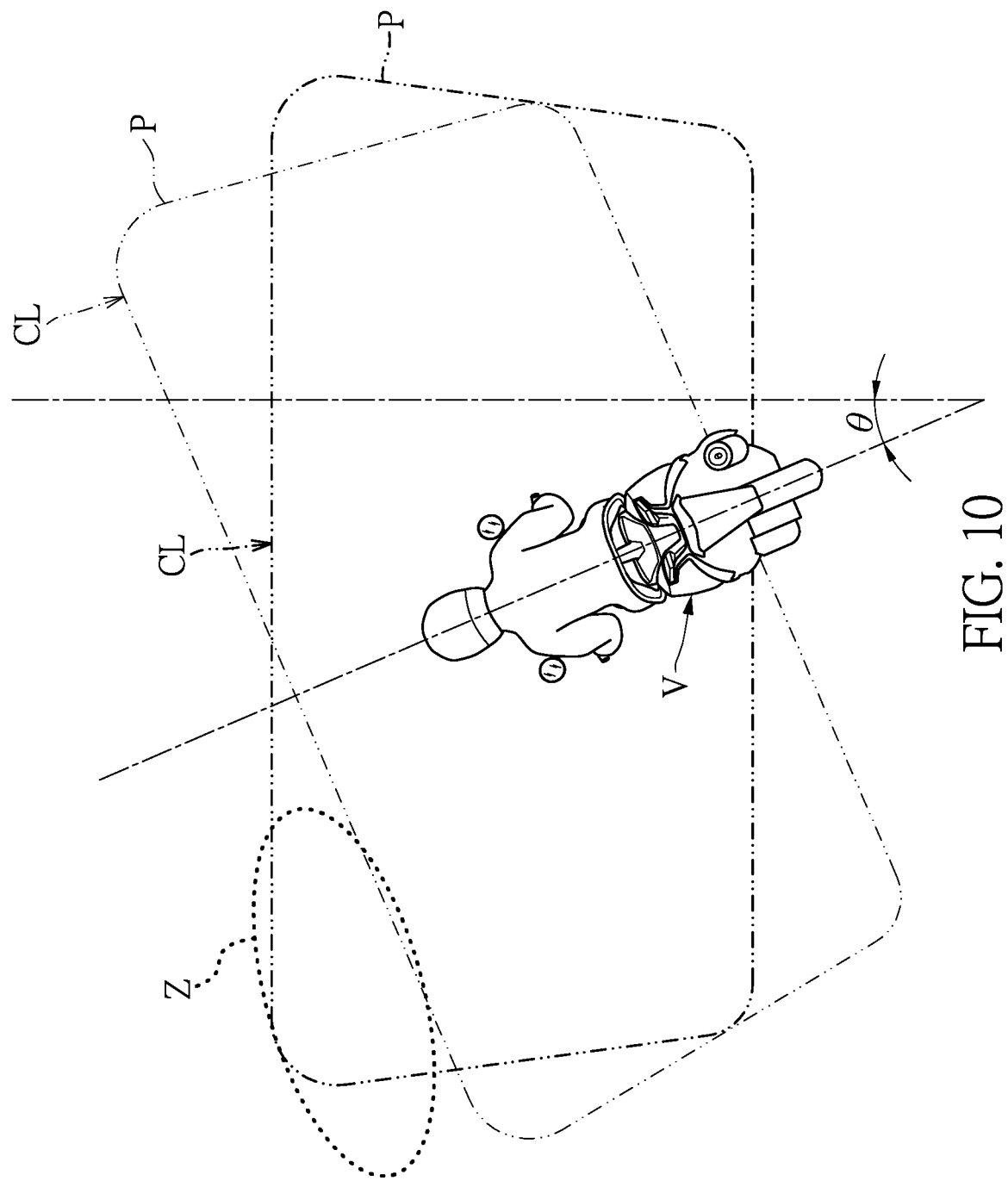
FIG. 10 is a schematic view showing a practical scenario of the intelligent follow-up illumination device according to one embodiment of the present disclosure.

As shown in FIG. 9 and FIG. 10, the intelligent follow-up illumination device D of the present disclosure can provide sufficient front illumination during changes in posture of the vehicle V (e.g., the vehicle V leans to the left or right at an angle θ relative to a road surface), so as to eliminate blind spots of a dark region Z in front of the vehicle, thereby ensuring driving safety. More specifically, as shown in FIG. 8 to FIG. 10, when the vehicle V has a posture change, the motion sensor 63 can detect a change in motion state of the control component 6 (control circuit board 61) caused by the posture change of the vehicle V, such as a change in direction, speed and/or acceleration of an upward or downward movement of the control component 6 (control circuit board 61). In response to different motion states, the control component 6 (control PCB 61) generates control commands such as a drive direction (e.g., a rotational direction) and a drive amount (e.g., a rotational drive amount) for causing the driving component 3 to drive the rotating component 2 to perform adaptive rotation operations, and send the control commands to the driving component 3. Accordingly, the rotating component 2 can be driven by the driving component 3 to rotate the light source component 4 (solid light source 41), the projection component 5, and the control component 6 (control PCB 61) at a predetermined angle α in a clockwise or counterclockwise direction, so as to regulate the orientation of the light distribution pattern P, thereby maintaining the cut-off line CL of the light distribution pattern P in a horizontal position (i.e., parallel to the H-H line).

More details about the components of the intelligent follow-up illumination device D of the present disclosure and limiting and matching relationships between them are described below.

Figure 7:
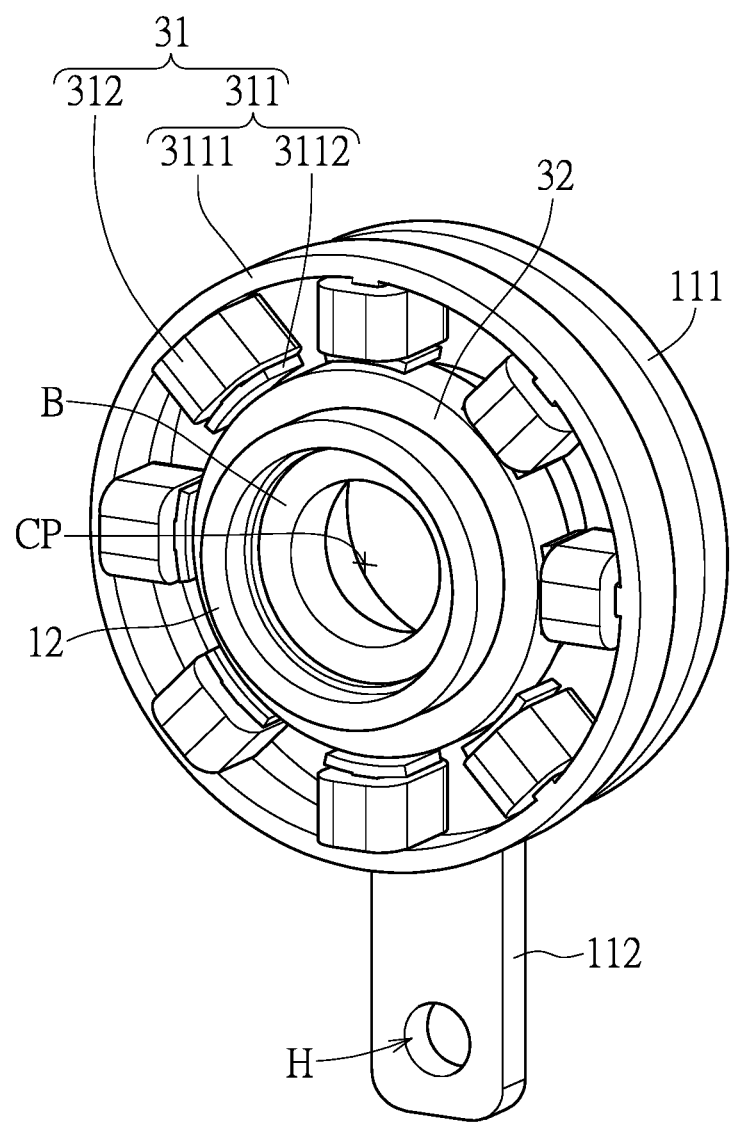
FIG. 7 is a schematic view showing an assembly of a support component, a driving component, and a bearing unit of the intelligent follow-up illumination device according to the first embodiment of the present disclosure.
Figure 11:
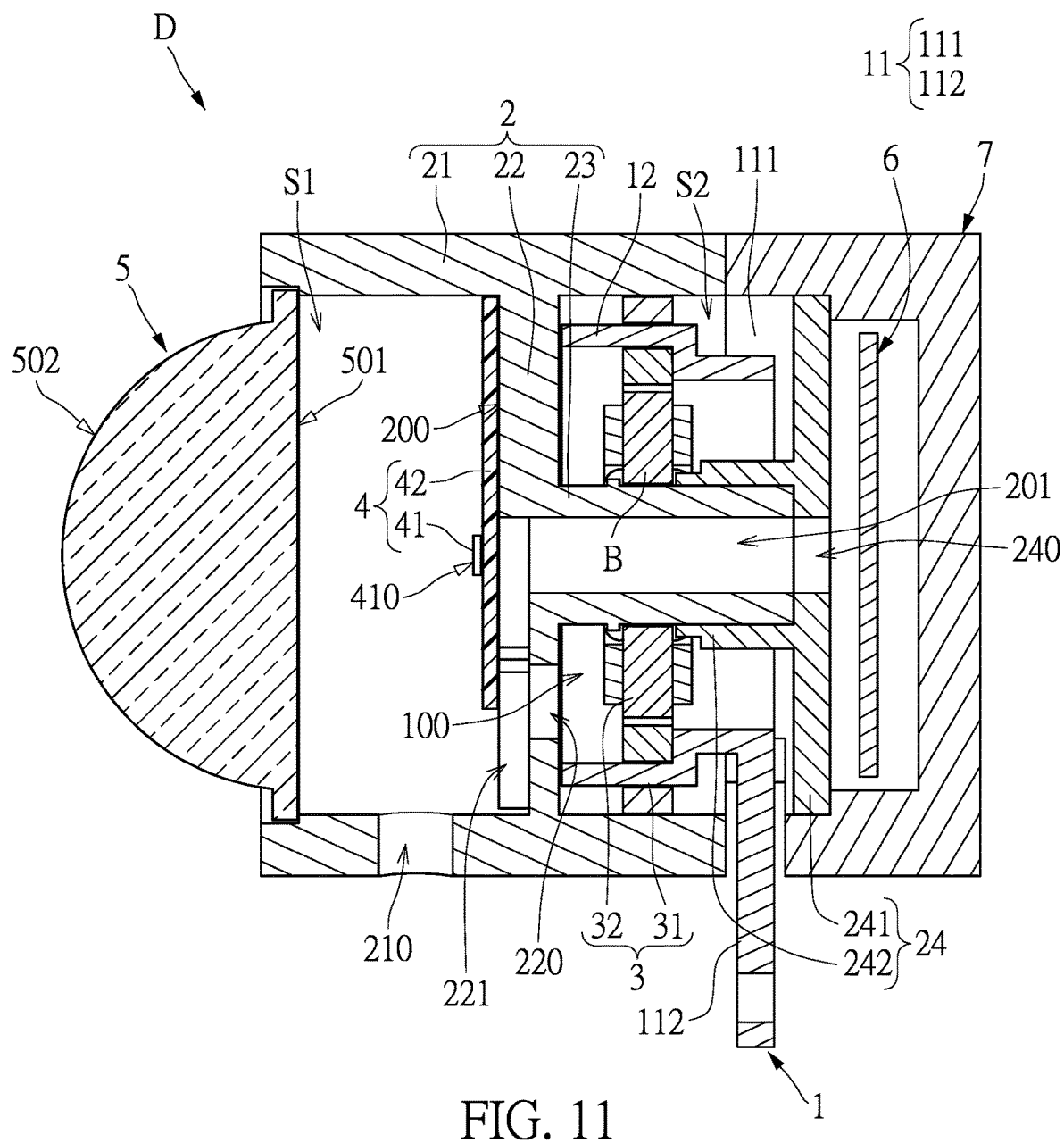
FIG. 11 is a schematic structural view of a variant of the intelligent follow-up illumination device according to the first embodiment of the present disclosure.
Figure 12:
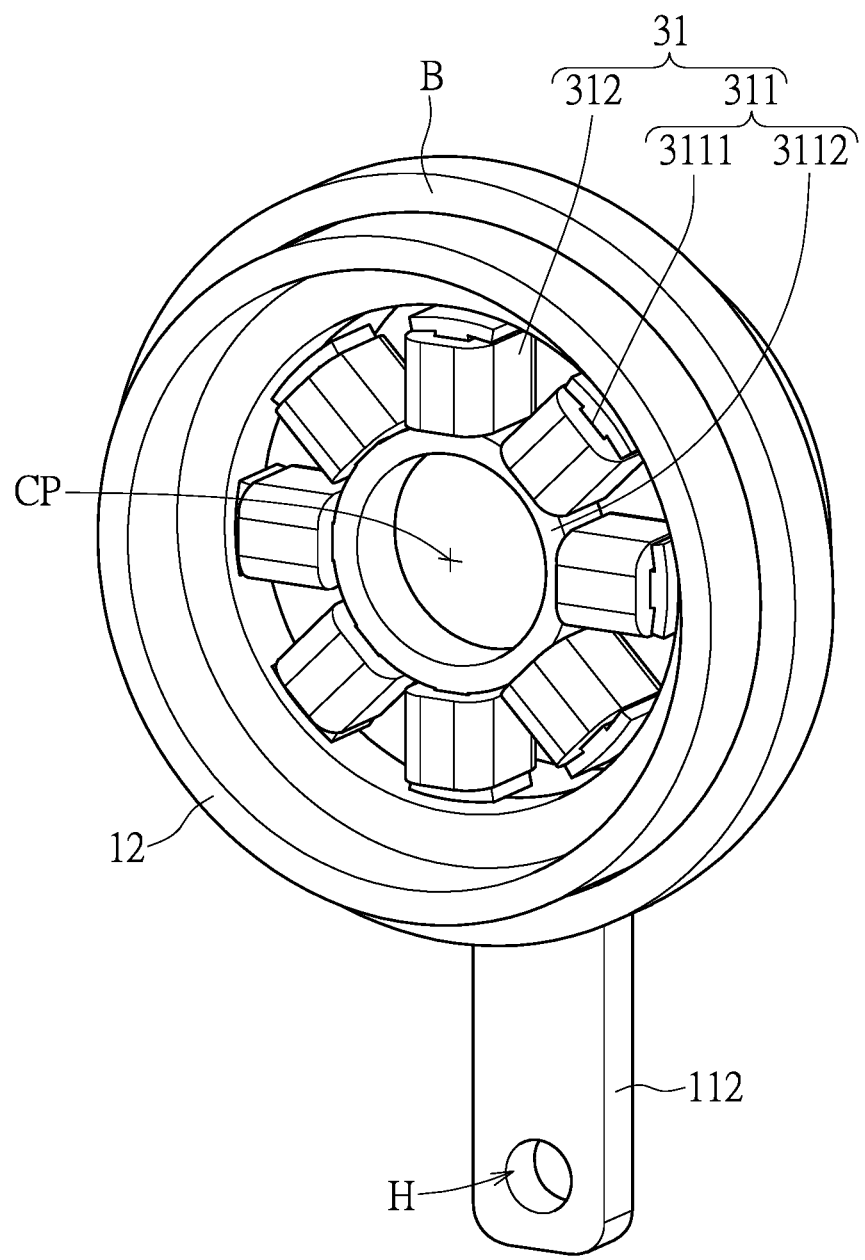
FIG. 12 is a schematic view showing the assembly of the support component, the driving component, and the bearing unit of the variant of the intelligent follow-up illumination device according to the first embodiment of the present disclosure.

Referring to FIG. 2 to FIG. 5, which are to be read in conjunction with FIG. 7, FIG. 11, and FIG. 12, the support component 1 serving as an assembly base of the entire illumination device is not only configured to stably install the entire illumination device on a vehicle body of the vehicle V, but also to integrate the driving component 3 into the rotating component 2 and enable the driving component 3 to directly drive the rotating component 2 without using any power transmitting mechanisms such as a drive shaft and a gear set. The support component 1 can include a supporting portion 11, an abutting portion 12 extending from the supporting portion 11, and an assembly slot 100 passing through the supporting portion 11 and the abutting portion 12. The supporting portion 11 is configured to be combined with the vehicle body. The abutting portion 12 is configured to stably retain the driving component 3 in an internal space of the rotating component 2. The assembly slot 100 is configured to enable a rotational matching connection between the rotating component 2 and the support component 1.

More specifically, the supporting portion 11 can include a supporting frame 111 and a supporting arm 112 that extends from an outer periphery of the supporting frame 111. Accordingly, the supporting portion 11 can have a structural strength sufficient to support the entire illumination device. Furthermore, the supporting arm 112 has a fixing hole H that allows for positioning on the vehicle body of the vehicle V by locking. The abutting portion 12 can be a sleeve structure that extends from one side of the supporting frame 111 in a direction perpendicular to an extension direction of the supporting arm 112. The above description is for exemplary purposes only and is not intended to limit the scope of the present disclosure.

The rotating component 2 serving as an operating component for realizing follow-up illumination can include a housing portion 21, a base portion 22 disposed inside the housing portion 21, and a shaft portion 23 extending from the base portion 22. The housing portion 21 defines an accommodation space for accommodating the support component 1, the driving component 3, and the light source component 4, and the projection component 5 is fixed by the housing portion 21. The light source component 4 is disposed on the base portion 22, such that a light transmission path from the light source component 4 passes through the projection component 5. The shaft portion 23 is pivotably coupled to the assembly slot 100 of the abutting portion 12, and defines the rotation axis A1. More specifically, the housing portion 21 can be a cylindrical structure with openings at both ends, and the base portion 22 can be a flat plate structure, but the present disclosure is not limited thereto.

Figure 5:
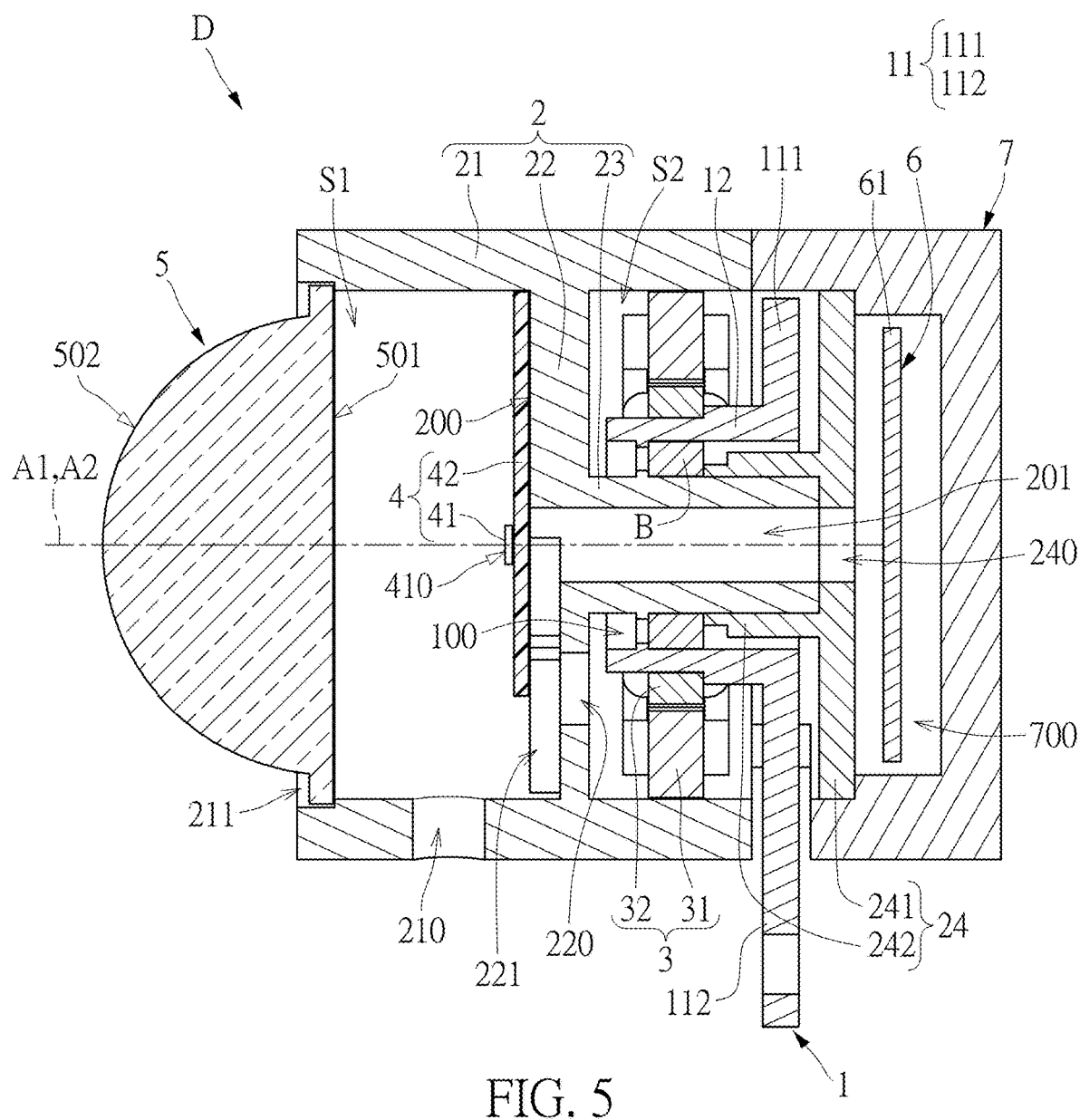
FIG. 5 is a schematic structural view of the intelligent follow-up illumination device according to the first embodiment of the present disclosure.

In the present embodiment, in the rotating component 2, the base portion 22 is disposed to divide the accommodation space of the housing portion 21 into a first accommodation space S1 and a second accommodation space S2. The first accommodation space S1 is located at one side (e.g., a front side) of the base portion 22 and the second accommodation space S2 is located at another opposite side (e.g., a rear side) of the base portion 22, and the shaft portion 23 extends from the base portion 22 to the outside of the second accommodation space S2. After completion of assembly, the abutting portion 12 of the support component 1 and the driving component 3 are located in the second accommodation space S2, the abutting portion 12 of the support component 1 is located between the housing portion 21 and the shaft portion 23 of the rotating component 2, and the light source component 4 is located in the first accommodation space S1. It should be noted that the driving component 3 can be disposed between the abutting portion 12 of the support component 1 and the housing portion 21 of the rotating component 2, as shown in FIG. 5. Alternatively, the driving component 3 can be disposed between the abutting portion 12 of the support component 1 and the shaft portion 23 of the rotating component 2, as shown in FIG. 11. Therefore, the beneficial effects of compact arrangement, small occupied space, high assembly efficiency, and stable operation can be achieved.

As shown in FIG. 5, FIG. 7, FIG. 11, and FIG. 12, the driving component 3 serving as a driving source of the entire illumination device can include an electromagnetic component 31 and a magnetic member 32. The electromagnetic component 31 and the magnetic member 32 can work with each other to produce an electromagnetic torque, thereby causing the rotating component 2 to rotate around the rotation axis A1 in a clockwise or counterclockwise direction. More specifically, the electromagnetic component 31 can include a core 311 and a plurality of coil windings 312. The core 311 has a ring portion 3111 and a plurality of leg portions 3112 that extend from an inner or outer periphery of the ring portion 3111 and are spaced apart from each other, and the coil windings 312 are respectively wrapped around the leg portions 3112. In practice, as shown in FIG. 5 and FIG. 7, the ring portion 3111 of the core 311 can be fixedly connected to the housing portion 21 of the rotating component 2, and the magnetic member 32 can be fixedly connected to the abutting portion 12 of the support component 1 and disposed opposite to the leg portions 3112 of the core 311. Alternatively, as shown in FIG. 11 and FIG. 12, the ring portion 3111 of the core 311 can be fixedly connected to the shaft portion 23 of the rotating component 2, and the magnetic member 32 can be fixedly connected to the abutting portion 12 of the support component 1 and disposed opposite to the leg portions 3112 of the core 311. The magnetic member 32 can be a single-piece magnet or consists of a number of magnets, but the present disclosure is not limited thereto.

In order for the rotation operation of the rotating component 2 to be more stable and smooth, a bearing unit B can be disposed between the support component 1 and the rotating component 2. The bearing unit B can be a thin-wall ball bearing, but is not limited thereto. When the driving component 3 is disposed between the abutting portion 12 of the support component 1 and the housing portion 21 of the rotating component 2, the bearing unit B is disposed between the abutting portion 12 of the support component 1 and the shaft portion 23 of the rotating component 2, as shown in FIG. 5 and FIG. 7. When the driving component 3 is disposed between the abutting portion 12 of the support component 1 and the shaft portion 23 of the rotating component 2, the bearing unit B is disposed between the abutting portion 12 of the support component 1 and the housing portion 21 of the rotating component 2, as shown in FIG. 11 and FIG. 12. However, the above description is for exemplary purposes only and is not intended to limit the scope of the present disclosure. Preferably, the core 311, the magnetic member 32, and the bearing unit B correspond in position to each other, and a geometric center CP of the ring portion 3111 of the core 311, the magnetic member 32, and the bearing unit B coincide with each other on the rotation axis A1. Accordingly, optimum structural stability can be achieved in the presence of only one bearing unit B.

The light source component 4 includes a solid light source 41 and a conductive substrate 42, and the solid light source 41 is mounted on the conductive substrate 42. In practice, the rotating component 2 has a carrying surface 200 in the first accommodation space S1 for disposing the light source component 4, such that the light source component 4 can simultaneously rotate with the rotating component 2. The solid light source 41 can include one or more light emitting units such as LED elements. The conductive substrate 42 can be a PCB, preferably a PCB having high thermal conductivity such as a metal core PCB (MCPCB), which can drive the solid light source 41 (e.g., one or more light emitting units) to light up in accordance with a control command, so as to produce a desired low beam or high beam light distribution pattern.

It is worth noting that the base portion 22 of the rotating component 2 can have the carrying surface 200 disposed thereon, and the carrying surface 200 can provide sufficient heat dissipation area. The MCPCB being the conductive substrate 42 can provide the shortest heat transfer path connected between the solid light source 41 and the rotating component 2, in which a material of the rotating component 2 includes a highly conductive metal, thereby increasing heat dissipation efficiency. Accordingly, heat generated by the solid light source 41 can be quickly and uniformly dissipated to the outside.

The projection component 5 is retained on the housing portion 21 and at a position on the light transmission path, and has a light input surface 501 and a light output surface 502 opposite to the light input surface 501. The projection component 5 has a design as follows: when light travels along the light transmission path of the solid light source 41 and enters the projection component 5 through the light input surface 501, it can be refracted from different positions on the light output surface 502, so as to produce a light distribution pattern P meeting the illumination requirements of the headlamp regulations such as ECE R112 and R113 regulations, which regulate headlamps for emitting a symmetrical or asymmetrical passing beam. More specifically, as shown in FIG. 5 and FIG. 11, the housing portion 21 of the rotating component 2 has an open end 211 in communication with the first accommodation space S1, and the projection component 5 is mechanically coupled to the open end 211, such that the projection component 5 can simultaneously rotate with the rotating component 2.

In the present embodiment, the projection component 5 can be an optical lens, in which the light input surface 501 is a flat surface and the light output surface 502 is an optical curved surface having different curvatures. In such an optical configuration, the projection component 5 can define an optical axis A2 that passes through the solid light source 41, in which the light input surface 501 is opposite to a light emitting surface 410 of the solid light source 41. Furthermore, the optical axis A2 of the projection component 5 is parallel to the rotation axis A1 of the rotating component 2, and preferably substantially coincides with the rotation axis A1 of the rotating component 2. Therefore, the control error of the rotation operation of the rotating component 2 can be reduced, thereby increasing the accuracy in adjusting the rotational angle of the projection component 5. As used herein, the term "substantially coincides with" means that the optical axis A2 of the projection component 5 coincides with or is close to the rotation axis A1 of the rotating component 2.

Referring to FIG. 5, FIG. 8, and FIG. 10, the control component 6 serving as a control center of the entire illumination device can include a control PCB 61, a processing unit 62, and the motion sensor 63 mentioned above, and the processing unit 62 and the motion sensor 63 are integrated on the control PCB 61. The control PCB 61 is disposed to be rotated by the rotating component 2. The motion sensor 63 can detect a change in motion state of the control PCB 61 that is caused by a posture change of the vehicle V. The processing unit 62 can send a corresponding control command to the driving component 3 according to information acquired by the motion sensor 63. Thus, the driving component 3 drives the rotating component 2 to perform an adaptive rotation operation (e.g., rotates at a predetermined angle), so as to eliminate or reduce blind spots of a dark region Z due to the posture change of the vehicle V.

In practice, the rotating component 2 can further include a retaining portion 24 for retaining the control PCB 61, such that the control PCB 61 can simultaneously rotate with the rotating component 2. The retaining portion 24 can include a supporting plate 241 and an engaging sleeve 242 extending from one side of the supporting plate 241. The supporting plate 241 can be disposed to connect as a whole with the control PCB 61. For example, the supporting plate 241 has one or more fixing structures (e.g., hollow column structures) disposed thereon to limit the movement of the control PCB 61. The engaging sleeve 242 is sleeved on and engaged with the shaft portion 23. However, the above description is for exemplary purposes only and is not intended to limit the scope of the present disclosure.

In the present embodiment, the shaft portion 23 has a front section adjacent to the base portion 22 and a rear section distant from the base portion 22. After completion of assembly, the shaft portion 23 passes through the assembly slot 100 of the support component 1, and at least a portion of the engaging sleeve 242 extends into the assembly slot 100 and is mechanically coupled to the rear section of the shaft portion 23. Furthermore, the electromagnetic component 31 and the magnetic member 32 of the driving component 3 and the bearing unit B correspond in position to the front section of the shaft portion 23, and are disposed in sequence along a direction perpendicular to the rotation axis A1, i.e., disposed in sequence from top to bottom or from bottom to top.

Figure 6:
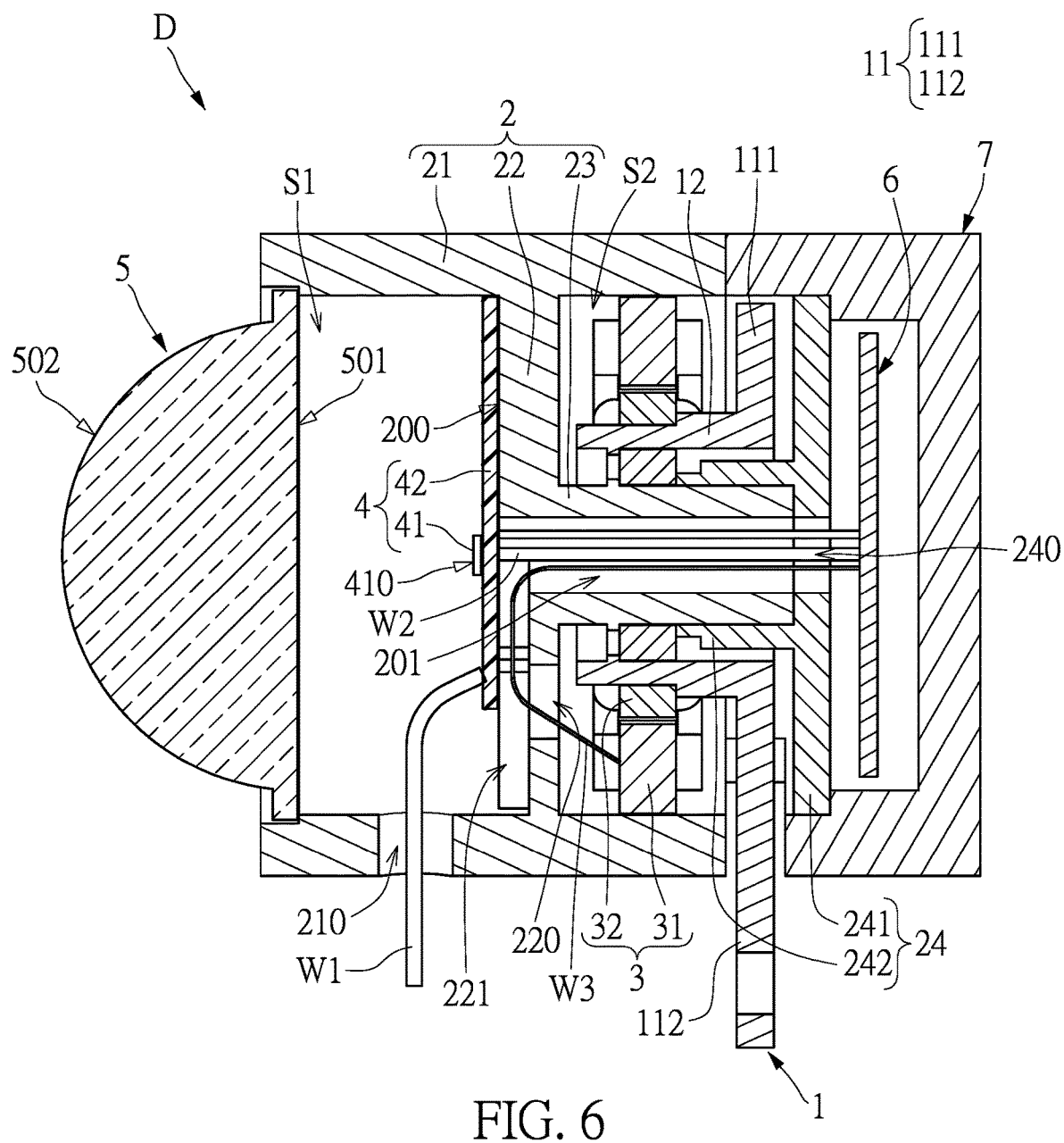
FIG. 6 is a schematic view showing the intelligent follow-up illumination device according to the first embodiment of the present disclosure with wires.

Referring to FIG. 5 and FIG. 6, the rotating component 2 can be disposed to allow for power and signal transmission between the light source component 4 and the vehicle V, between the light source component 4 and the control component 6, and between the driving component 3 and the control component 6. More specifically, the housing portion 21 is provided with a first wire hole 210. The base portion 22 is provided with a second wire hole 220 and a wire groove 221 that is recessed from the carrying surface 200. Furthermore, a wire passage 201 is provided and passes through the base portion 22 and the shaft portion 23 along the direction of the rotation axis A1. The supporting plate 241 of the retaining portion 24 is provided with a third wire hole 240. The first wire hole 210 can allow the first accommodation space S1 of the housing portion 21 to be in communication with the outside. The second accommodation space S2 of the housing portion 21 can be in spatial communication with the wire groove 221 through the second wire hole 220, and there is a spatial communication between the wire groove 221, the wire passage 201, and the third wire hole 240.

In use, a conductive wire W1 for connecting the light source component 4 to a vehicle body end can extend into the first accommodation space S1 through the first wire hole 210 to be connected to the conductive substrate 42. A conductive wire W2 for connecting the light source component 4 to the control component 6 can be routed through the wire passage 201 to extend out of the rotating component 2, such that two ends of the wire W2 are respectively connected to the conductive substrate 42 and the control component 61. Furthermore, a lead wire W3 of the driving component 3 (e.g., a lead wire of the coil windings 312) extends into the wire groove 221 from the second accommodation space S2, and passes through the wire groove 221 and the wire passage 201 in sequence to extend out of the rotating component 2 and connect to the control PCB 61.

Second Embodiment

Figure 13:
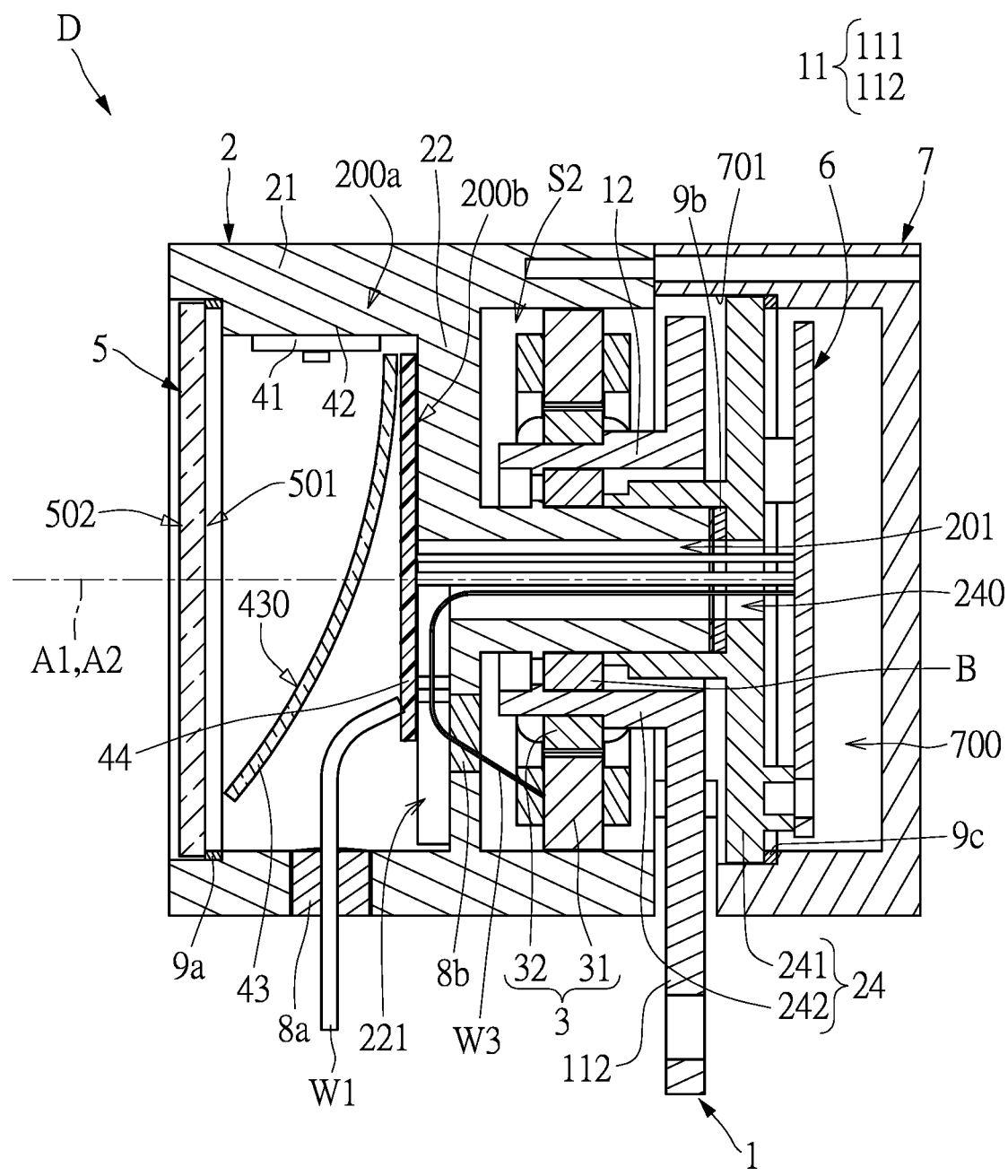
FIG. 13 is a schematic structural view of an intelligent follow-up illumination device according to a second embodiment of the present disclosure.
Figure 14:
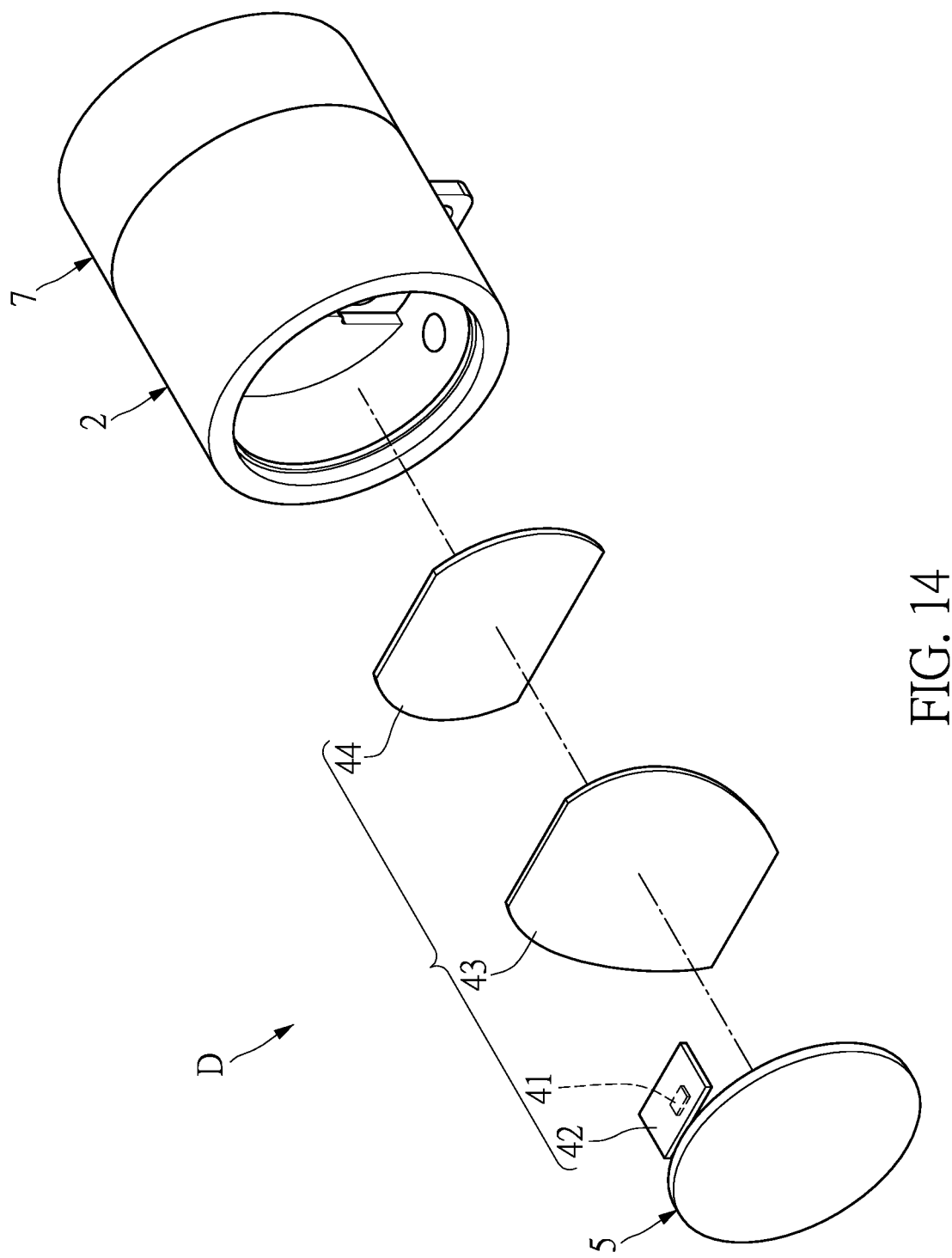
FIG. 14 is a schematic partly-exploded view of the intelligent follow-up illumination device according to the second embodiment of the present disclosure.

Reference is made to FIG. 13 and FIG. 14, which are read in conjunction with FIG. 1 and FIG. 8 to FIG. 10. A second embodiment of the present disclosure provides an intelligent follow-up illumination device D, which includes a support component 1, a rotating component 2, a driving component 3, a light source component 4, a projection component 5, and a control component 6. The support component 1 is adapted to be installed on a vehicle V in a fixed state. The rotating component 2 is disposed to rotate relative to the support component 1. The driving component 3 is disposed between the support component 1 and the rotating component 2 to drive the rotating component 2 to perform a rotation operation around a rotation axis A1. Furthermore, the light source component 4 is disposed inside the rotating component 2 to emit illumination light. The projection component 5 is retained on the rotating component 2 to project the illumination light outwardly, so as to form a light distribution pattern P. The control component 6 is connected to the rotating component 2 and includes a motion sensor 63.

It should be noted that the light source component 4, the projection component 5, and the control component 6 are disposed to simultaneously rotate with the rotating component 2. The motion sensor 63 is adapted for acquiring motion state information of the control component 6. In addition, the control component 6 is configured to send a control command to the driving component 3 according to the motion state information acquired by the motion sensor 63. Accordingly, the rotating component 2 can be driven by the driving component 3 to rotate the light source component 4, the projection component 5, and the control component 6 at a predetermined angle in a clockwise or counterclockwise direction, so as to regulate the orientation of the light distribution pattern P, thereby maintaining a cut-off line CL of the light distribution pattern P in a horizontal position (i.e., parallel to the H-H line).

The present embodiment adopts an optical configuration different from that of the first embodiment. In such an optical configuration, each of a light input surface 501 and a light output surface 502 of the projection component 5 is a flat surface, and the light source component 4 further includes a light guiding portion 43 that is configured to guide illumination light emitted from a solid light source 41 to the light input surface 501 of the projection component 5. In practice, the projection component 5 can be a glass cover plate, but is not limited thereto. The rotating component 2 has a first carrying surface 200a located in a first accommodation space S1. The first carrying surface 200a is disposed on a housing portion 21 for disposing a conductive substrate 42, and the solid light source 41 is mounted on the conductive substrate 42. The light guiding portion 43 corresponds in position to the solid light source 41 and has a reflecting surface 430 facing toward a light emitting surface 410 of the solid light source 41. Accordingly, the illumination light emitted from the solid light source 41 can be reflected by the reflecting surface 430 to travel toward the light input surface 501 of the projection component 5. The reflecting surface 430 of the light guiding portion 43 can be a curved surface based on elliptic curves, but the present disclosure is not limited thereto.

In the present embodiment, the light source component 4 further includes an adapter board 44 that is configured to establish an electrical connection between the conductive substrate 42 and the control component 61. Furthermore, the rotating component 2 has a second carrying surface 200b located in a first accommodation space S1, which is connected and perpendicular to the first carrying surface 200a. The second carrying surface 200b is disposed on a base portion 22 for disposing the adapter board 44. In practice, the adapter board 44 can be a PCB, and a conductive wire W1 from a vehicle body end can be connected to the adapter board 44 to be in electrical connection with the conductive substrate 42.

As shown in FIG. 13, in order to increase reliability, the intelligent follow-up illumination device D of the present disclosure can further include a casing 7 for enclosing the control component 6, thereby isolating the control component 6 from the outside. Accordingly, the control component 6 is not easily affected by external environmental factors such as dust, moisture, and water. The casing 7 is disposed to close a second accommodation space S2 of the housing portion 21, and a closed space 700 is surroundingly defined by the casing 7 and a supporting plate 241 of the retaining portion 24, in which the control component 6 is located in the closed space 700. Furthermore, in order to improve waterproof and airtightness of the entire illumination device, a first sealing plug 8a can be disposed in a first wire hole 210 and filled in a remaining space other than a space occupied by the conductive wire W1. A second sealing plug 8b can be disposed in a second wire hole 220 and filled in a remaining space other than a space occupied by a lead wire W3. In addition, a first sealing gasket 9a can be disposed at a position (e.g., a joint position) between the housing portion 21 of the rotating component 2 and the projection component 5 and along a peripheral edge of the projection component 5. A second sealing gasket 9b can be disposed at a position (e.g., a joint position) between a shaft portion 23 of the rotating component 2 and an engaging sleeve 242 of the retaining portion 24, and surrounds the wire passage 201. A third sealing gasket 9c can be disposed at a position (e.g., a joint position) between a supporting plate 241 of the retaining portion 24 and an inner surface 701 of the casing 7 and along a peripheral edge of the supporting plate 241, and surrounds the closed space 700.

The relevant technical details mentioned in the first embodiment are still valid in the present embodiment, and will not be repeated herein for the sake of brevity. Similarly, the technical details mentioned in the present embodiment can also be applied in the first embodiment.

Beneficial Effects of the Embodiments

In conclusion, in the intelligent follow-up illumination device provided by the present disclosure, by virtue of the rotating component including a housing portion, a base portion disposed inside the housing portion, and a shaft portion extending from the base portion, the housing portion defining an accommodation space for accommodating the support component, the driving component, and the light source component, the projection component being fixed by the housing portion and the light source component being disposed on the base portion such that a light transmission path from the light source component passes through the projection component, the shaft portion defining the rotation axis and being connected as a whole to the control component, the support component including an abutting portion and an assembly slot passing through the abutting portion, the abutting portion being disposed to retain the driving component in the accommodation space of the housing portion, and the assembly slot being pivotably coupled to the shaft portion, can integrate the driving component into the rotating component and enable the driving component to directly drive the rotating component without using any power transmitting mechanisms such as a drive shaft and a gear set. Furthermore, in the intelligent follow-up illumination device of the present disclosure, the optical axis of the projection component is parallel to the rotation axis of the rotating component, and preferably substantially coincides with the rotation axis of the rotating component. Therefore, the control error of the rotation operation of the rotating component can be reduced, thereby increasing the accuracy in adjusting the rotational angle of the projection component.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An intelligent follow-up illumination device, comprising:
   a support component adapted to be installed on a vehicle in a fixed state;
   a rotating component disposed to rotate relative to the support component;
   a driving component disposed between the support component and the rotating component to drive the rotating component to perform a rotation operation around a rotation axis according to a control command;
   a light source component disposed inside the rotating component to emit illumination light; and
   a projection component retained on the rotating component to project the illumination light outwardly, so as to form a light distribution pattern;
   wherein the rotating component includes a housing portion, a base portion disposed inside the housing portion, and a shaft portion extending from the base portion; wherein the housing portion defines an accommodation space for accommodating the support component, the driving component, and the light source component, the projection component is fixed by the housing portion and the light source component is disposed on the base portion, such that a light transmission path from the light source component passes through the projection component, and the shaft portion defines the rotation axis;
   wherein the support component includes an abutting portion that is disposed to retain the driving component in the accommodation space of the housing portion; and
   wherein the shaft portion is pivotably coupled to the support component via a bearing unit.

2. The intelligent follow-up illumination device according to claim 1, further comprising a control component that is configured to send the control command to the driving component and includes a control PCB located outside the accommodation space.

3. The intelligent follow-up illumination device according to claim 2, wherein the control component is connected to the shaft portion.

4. The intelligent follow-up illumination device according to claim 1, wherein the support component includes an assembly slot that passes through the abutting portion and is pivotably coupled to the shaft portion.

5. The intelligent follow-up illumination device according to claim 1, further comprising a casing enclosing the control component.

6. The intelligent follow-up illumination device according to claim 1, wherein the control component includes a motion sensor adapted for acquiring motion state information of the rotating component, and is configured to send the control command to the driving component according to the motion state information.

7. The intelligent follow-up illumination device according to claim 1, wherein the base portion is disposed to divide the accommodation space of the housing portion into a first accommodation space and a second accommodation space, the first accommodation space is located at one side of the base portion, the second accommodation space is located at another opposite side of the base portion, and the shaft portion extends out of the second accommodation space from the base portion; the abutting portion of the support component and the driving component are located in the second accommodation space and between the housing portion and the shaft portion of the rotating component, and the light source component is located in the first accommodation space.

8. The intelligent follow-up illumination device according to claim 7, wherein the driving component is disposed between the abutting portion of the support component and the housing portion of the rotating component.

9. The intelligent follow-up illumination device according to claim 8, wherein the driving component includes an electromagnetic component and a magnetic member, the electromagnetic component is fixedly connected to the housing portion of the rotating component, and the magnetic member is fixedly connected to the abutting portion of the support component.

10. The intelligent follow-up illumination device according to claim 9, wherein the electromagnetic component includes a core and a plurality of coil windings, the core has a ring portion and a plurality of leg portions, the ring portion is fixedly connected to the housing portion of the rotating component, the leg portions extend from an inner periphery of the ring portion and are spaced apart from each other and disposed opposite to the magnetic member, and the coil windings are respectively wrapped around the leg portions.

11. The intelligent follow-up illumination device according to claim 10, wherein the bearing unit disposed between the abutting portion of the support component and the shaft portion of the rotating component.

12. The intelligent follow-up illumination device according to claim 11, wherein the core, the magnetic member, and the bearing unit correspond in position to each other, and geometric centers of the ring portion of the core, the magnetic member, and the bearing unit coincide with each other on the rotation axis.

13. The intelligent follow-up illumination device according to claim 7, wherein the driving component is disposed between the abutting portion of the support component and the shaft portion of the rotating component.

14. The intelligent follow-up illumination device according to claim 13, wherein the driving component includes an electromagnetic component and a magnetic member, the electromagnetic component is fixedly connected to the shaft portion of the rotating component, and the magnetic member is fixedly connected to the abutting portion of the support component.

15. The intelligent follow-up illumination device according to claim 14, wherein the electromagnetic component includes a core and a plurality of coil windings, the core has a ring portion and a plurality of leg portions, the ring portion is fixedly connected to the shaft portion of the rotating component, the leg portions extend from an outer periphery of the ring portion and are spaced apart from each other and disposed opposite to the magnetic member, and the coil windings are respectively wrapped around the leg portions.

16. The intelligent follow-up illumination device according to claim 15, wherein the bearing unit disposed between the abutting portion of the support component and the housing portion of the rotating component.

17. The intelligent follow-up illumination device according to claim 16, wherein the core, the magnetic member, and the bearing unit correspond in position to each other, and geometric centers of the ring portion of the core, the magnetic member, and the bearing unit coincide with each other on the rotation axis.

18. The intelligent follow-up illumination device according to claim 6, wherein the motion sensor is integrated on the control PCB, and the rotating component includes a retaining portion for retaining the control PCB.

19. The intelligent follow-up illumination device according to claim 18, wherein the retaining portion includes a supporting plate and an engaging sleeve extending from the supporting plate, the supporting plate is connected integrally with the control PCB, and the engaging sleeve is sleeved on and engaged with the shaft portion.

20. The intelligent follow-up illumination device according to claim 19, wherein a closed space is surroundingly defined by the casing and the supporting plate of the retaining portion, and the control PCB is located in the closed space.

21. The intelligent follow-up illumination device according to claim 1, wherein the projection component has a light input surface and a light output surface opposite to the light input surface, the light source component includes a solid light source and a light guiding portion, and the solid light source is configured to emit illumination light and the light guiding portion is configured to guide the illumination light to the light input surface of the projection component.

22. The intelligent follow-up illumination device according to claim 21, wherein each of the light input surface and the light output surface is a flat surface.

23. The intelligent follow-up illumination device according to claim 21, wherein the housing portion has a first carrying surface, and the base portion has a second carrying surface that is perpendicularly connected to the first carrying surface; the light source component includes a conductive substrate and an adapter board, the conductive substrate is disposed on the first carrying surface, the solid light source is mounted on the conductive substrate, and the adapter board is disposed on the second carrying surface and configured to establish an electrical connection between the conductive substrate and the control component.

24. The intelligent follow-up illumination device according to claim 7, wherein the light source component is disposed on a carrying surface of the base portion and includes a conductive substrate and a solid light source mounted on the conductive substrate, the control component includes a control PCB, the rotating component has a wire passage, a wire is routed through the wire passage, and two ends of the wire are respectively connected to the conductive substrate and the control component.

25. The intelligent follow-up illumination device according to claim 24, wherein the wire passage passes through the base portion and the shaft portion.

26. The intelligent follow-up illumination device according to claim 24, wherein the base portion has a wire hole and a wire groove, the second accommodation space of the housing portion is in spatial communication with the wire groove through the wire hole; and wherein a lead wire of the driving component extends through the wire hole from the second accommodation space, and passes through the wire groove and the wire passage in sequence to connect to the control PCB.

* * * * *